United States Patent [19]

Behnisch

[11] 4,358,992  
[45] Nov. 16, 1982

[54] LID FOR COOKPOT

[75] Inventor: Roland Behnisch, Tübingen-Weilheim, Fed. Rep. of Germany

[73] Assignee: Braun & Kemmler GmbH & Co. KG, Reutlingen, Fed. Rep. of Germany

[21] Appl. No.: 284,449

[22] Filed: Jul. 17, 1981

[51] Int. Cl.³ .............................................. A47J 27/52
[52] U.S. Cl. ..................................... 99/345; 126/381; 220/231
[58] Field of Search ....................... 220/231, 273, 274; 126/299 C, 384, 386, 389, 381; 99/345, 347

[56] References Cited

U.S. PATENT DOCUMENTS

| | | | |
|---|---|---|---|
| 2,083,147 | 6/1937 | Clackson | 99/345 |
| 3,022,721 | 2/1962 | Vath | 99/345 |
| 3,047,186 | 7/1962 | Serio | 220/231 |
| 3,089,943 | 5/1963 | Serio | 220/231 |
| 3,101,707 | 8/1963 | Ryan | 126/381 |
| 3,362,566 | 1/1968 | Hanania | 220/231 |
| 4,075,939 | 2/1978 | Horn | 99/345 |

Primary Examiner—George E. Lowrance  
Attorney, Agent, or Firm—Michael J. Striker

[57] ABSTRACT

A cookpot lid according to the instant invention has a lid body formed with two vertically throughgoing apertures and a reservoir overlying the aperture and rotatable on the lid body about an axis adjacent the aperture. The reservoir is formed with two vertically throughgoing holes alignable vertically with the respective apertures in a predetermined angular position of the reservoir on the lid body. The holes and apertures are spaced the same distance from the axis. A stop is provided so that in one end position of the reservoir, which is formed as a handle, the two holes are aligned with the apertures for maximum flow, and in the opposite end position only one of the apertures is aligned with only one of the holes for less flow. In between these positions no hole is aligned with an aperture so no flow is possible.

12 Claims, 3 Drawing Figures

LID FOR COOKPOT

FIELD OF THE INVENTION

The present invention relates to a cookpot lid. More particularly this invention concerns such a lid provided with a reservoir from which a liquid can drip through the lid into the cookpot.

BACKGROUND OF THE INVENTION

A cook frequently needs to periodically add a small quantity of liquid to a cookpot while same is on the heat. To save the cook the repeated chore of opening up the pot and pouring in the necessary small quantity of liquid, it has been suggested to provide a cookpot lid with a reservoir and structure allowing the liquid to drip down into the pot at a controlled and relatively slow rate.

Such a pot typically has a piece of porous material forming the floor of a cup-shaped reservoir. The material to be dosed into the pot therefore seeps through this porous floor.

The disadvantage of this construction is that the porous material through which the liquid seeps can clog. Furthermore the dosing rate cannot be varied, so that if the dosing rate is too fast the user must add the liquid manually, and if it is too slow extra must be added periodically by hand. Finally the porous material is normally very difficult if not impossible to clean.

OBJECTS OF THE INVENTION

It is therefore an object of the present invention to provide an improved cooktop lid of the dosing type.

Another object is the provision of such a lid whose dosing rate can be varied and which is relatively easy to clean.

SUMMARY OF THE INVENTION

These objects are attained according to the instant invention in a cookpot lid having a lid body formed with a vertically throughgoing aperture and a reservoir overlying the aperture and rotatable on the lid body about an axis adjacent the aperture. The reservoir is formed with a vertically throughgoing hole alignable vertically with the aperture in a predetermined angular position of the reservoir on the lid body. The hole and aperture are spaced the same distance from the axis.

Thus with the system according to this invention it is possible to fully or partially align the hole with the aperture to allow liquid in the reservoir to drip through into the cookpot. It is also possible to move these two formations completely out of alignment with each other to stop dosing the liquid into the pot altogether and similarly to prevent any leakage of steam out of the pot into the reservoir.

According to a further feature of this invention, the body is formed with two such angularly spaced apertures and the reservoir is similarly formed with two such angularly spaced holes. The lid further comprises at least one stop engageable between the lid and reservoir and defining therfore a pair of angularly offset end positions in one of which both of the apertures are aligned with the respective holes and in the other of which only one of the apertures is aligned with only one of the holes. Thus it becomes fairly easy to control the dosing rate.

In accordance with yet another feature of the present invention, the body is formed with an arcuate slot centered on the axis. The reservoir has a downwardly extending projection engaged in the slot and constituting the stop. Between the end positions no liquid will be able to flow down from the reservoir into the cookpot and no steam can escape upwardly from the pot into the reservoir.

The reservoir according to the invention is secured in place by a screw engaging upwardly through the lid body at the axis and screwed into the reservoir. In fact, the reservoir is formed as a cup-shaped handle and has an outwardly and downwardly flared skirt engaging the body. The body is formed at and around the axis with a recess partially receiving the reservoir, with the skirt engaging the body radially outside the recess.

According to another feature of this invention the formation of bubbles in the liquid in the reservoir, particularly when the hole and aperture are being used primarily as a vent, is avoided when the reservoir has a floor having an upper surface and the hole has an upper mouth opening slightly above the upper surface. Thus if there is a modest quantity of liquid in the reservoir upwardly moving gas will not effectively blow bubbles using this liquid. This result is most effectively achieved by forming the floor with a depression around the upper mouth of the holes. If the floor is generally planar except at the depression, the upper mouth should be, according to this invention, substantially level with the floor except at the depression. Bubble formation is further eliminated when the reservoir has a lower surface formed with a raised portion around the hole and when the hole tapers upwardly. This raised portion is spaced slightly above the lid body.

Thus with the cookpot lid according to the instant invention it is possible to control the dosing rate relatively easily. As simple holes are used for the liquid to pass through, the problems of cleaning a porous body are eliminated. What is more constituting the reservoir as a simple synthetic-resin handle allows the system to be built at very low cost, in fact making it add virtually nothing to the construction costs of the lid.

DESCRIPTION OF THE DRAWING

The above and other objects, features, and advantages of the instant invention will become more readily apparent from the following, reference being made to the accompanying drawing in which.

SPECIFIC DESCRIPTION

Figure 1:
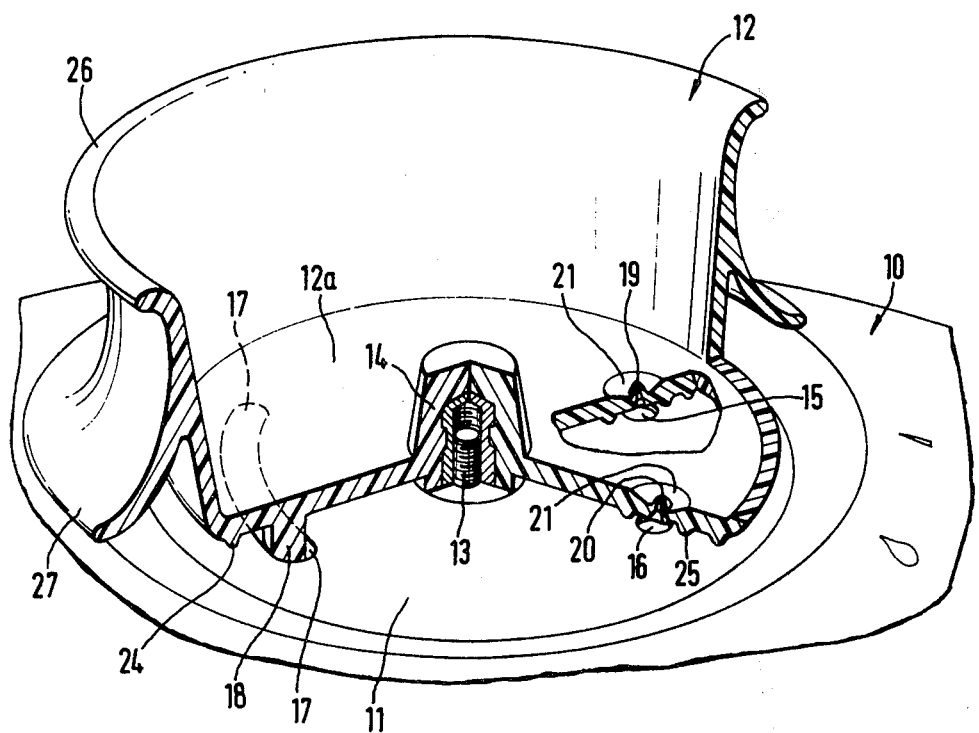
FIG. 1 is a large-scale perspective view, partially broken away, illustrating the instant invention.
Figure 2:
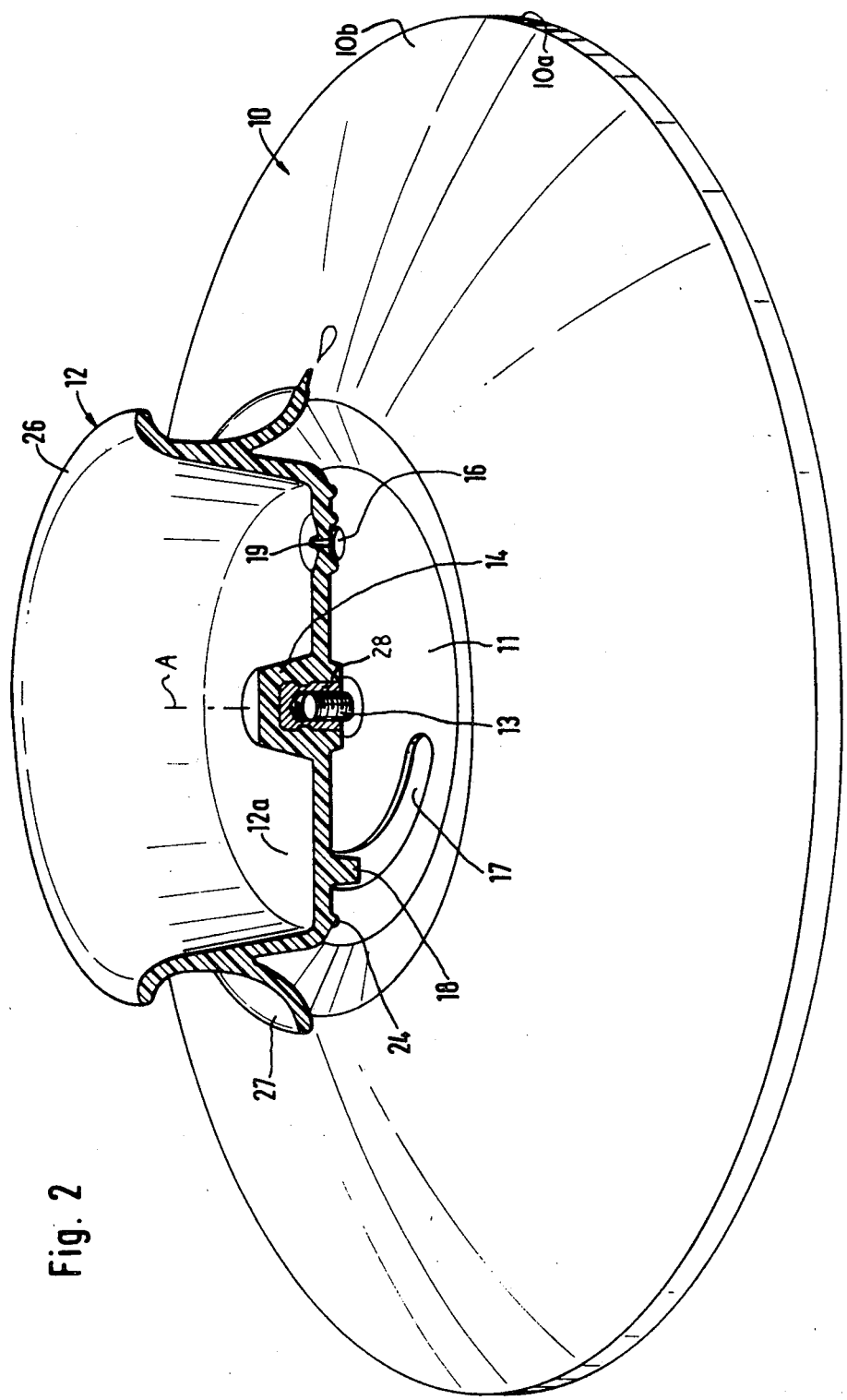
FIG. 2 is a larger-scale vertical section through a detail of FIG. 1.

As seen in FIGS. 1 and 2 a cookpot lid has a body 10 of standard shape, that is with a downwardly extending cylindrical rim 10a and an upwardly covex and domed center part 10b both centered on a normally upright axis A. Centrally, that is at the axis A, the body 10 is formed with a flat recess 11. A cup-shaped synthetic-resin (e.g., a phenol) reservoir/handle 12 is secured over this recess 11 by means of a machine screw 13 extending upwardly through the lid body 10 at the axis A and screwed into a metal sleeve 28 fitted into a central raised portion of the reservoir/handle 12. The reservoir/handle 12 therefore can rotate relative to the body 10 about the axis A.

The lid body 10 is formed in the recess 11 with a pair of slightly upwardly flared throughgoing circular apertures 15 and 16 radially equispaced from the axis A and angularly spaced from each other. In addition the lid body 10 is formed in the recess 11 at a location generally diametrically opposite the apertures 15 and 16 with a circularly arcuate slot 17 having a center of curvature at the axis A.

The reservoir/handle 12 has a floor 12a that is generally planar and that is formed with a downwardly projecting tab or finger 18 and with two vertically throughgoing holes 19 and 20. These two holes 19 and 20 are at the same spacing from the axis A as the apertures 15 and 16. The tab 18 defines for the reservoir/handle 12 two angularly offset end positions in each of which the tab 18 engages a respective end of the slot 17. In one of these positions as shown in FIG. 1 the holes 15 and 16 are aligned with the respective apertures 19 and 20 for maximum flow through these aligned openings. In the other position as shown in FIG. 2 only the hole 19 is aligned with the aperture 16; the other unillustrated hole 20 is not aligned with the aperture 15 so that the flow cross section is halved.

Figure 3:
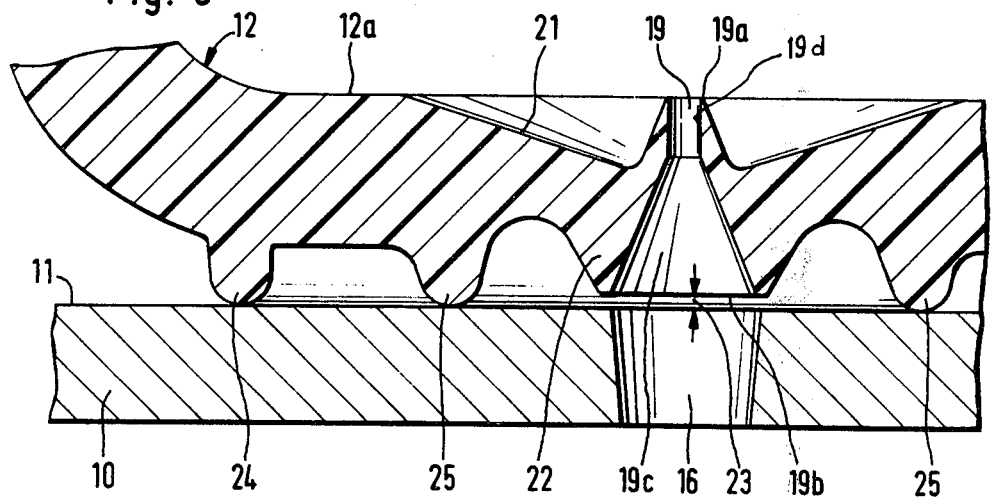
FIG. 3 is a partly broken-away view of the arrangement of this invention in a position different from that of FIG. 1.

The planar upper surface of the floor 12a is formed as best seen in FIG. 3 about each of the holes 19 and 20 with a depression 21. The holes 19 and 20 have raised upper mouths, as illustrated at 19a in FIG. 3, which are just at the level of the plane of the floor 12a. In addition the hole 19 has a small-diameter cylindrical upper portion 19d and a downwardly flaring lower portion 19c opening at a lower mouth 19b spaced above the upper surface of the recess 11 by a short distance 23 smaller than the diameter of the portion 19a. The lower mouth 19b is formed by a downwardly projecting annular ridge 22 of the synthetic-resin reservoir/handle 12. This type of formation, which is duplicated for the hole 20, prevents bubbles from being formed if vapor rises in the hole 19.

Leakage from the space between the handle/reservoir 12 and the upper surface of the recess 11 is prevented by annular ridges 24 and 25 formed on the lower surface of the reservoir/handle 12 around each of the holes 19 and 20. Furthermore the reservoir/handle 12 has an outwardly turned upper edge 26 that facilitates grabbing the lid by this structure, and a downwardly and outwardly flared skirt 27 that engages the lid portion 10b radially outside the recess 11 to stabilize the reservoir/handle 12 on the lid 10 and make a neat appearance. This skirt 27 also causes any liquid slopped over the upper edge 26 to run down over the lid 10 and not into the recess 11.

The lid according to the instant invention therefore allows a liquid to be dosed automatically into the pot it covers. The liquid is poured into the cup-shaped reservoir/handle 12 which is twisted to dispense it at the desired rate. The arrangement is very simple and will have a long service life.

I claim:

1. A cookpot lid, comprising a lid body and a cup-shaped reservoir adapted to be filled with liquid and positioned above said lid body, said reservoir being rotatable on said body about a central axis thereof, and liquid-dosing means allowing the liquid to drip down from said reservoir into the cookpot when desired, said liquid-dosing means including at least one vertical through aperture formed in said lid body and spaced from said axis, and at least one vertical circular through hole of a predetermined diameter formed in said reservoir and spaced from said axis the same distance as said aperture, said hole being vertically alignable with said aperture in a predetermined angular position of said reservoir to allow liquid in said reservoir to drip through said aperture and said hole into the cookpot.

2. The cookpot lid defined in claim 1, wherein said body is formed with two such angularly spaced apertures and said reservoir is similarly formed with two such angularly spaced holes, said lid further comprising at least one stop engageable between said lid body and said reservoir and defining therefor a pair of angularly offset end positions in one of which both of said apertures are aligned with the respective holes and in the other of which only one of said apertures is aligned with only one of said holes.

3. The cookpot lid defined in claim 2, wherein said body is formed with an arcuate slot centered on said axis, said reservoir having a downwardly extending projection engaged in said slot and constituting said stop.

4. The cookpot lid defined in claim 1, further comprising a screw engaging upwardly through said body at said axis and screwed into said reservoir.

5. The cookpot lid defined in claim 4, wherein said reservoir is formed as a handle and has an outwardly and downwardly flared skirt engaging said lid body.

6. The cookpot lid defined in claim 5, wherein said body is formed at and around said axis with a recess partially receiving said reservoir, said skirt engaging said body radially outside said recess.

7. The cookpot lid defined in claim 1, wherein said reservoir has a floor having an upper surface, said hole having an upper mouth opening slightly above said upper surface.

8. The cookpot lid defined in claim 7, wherein said hole has an upper cylindrical portion of said predetermined diameter and a downwardly flaring lower portion.

9. The cookpot lid defined in claim 8, wherein said floor is formed with a depression around said upper portion.

10. The cookpot lid defined in claim 9, wherein said floor is generally planar except at said depression, said upper mouth being substantially level with said floor except at said depression.

11. The cookpot lid defined in claim 1, wherein said reservoir has a lower surface formed with a raised portion around said hole.

12. The cookpot lid defined in claim 11, wherein said raised portion is spaced slightly above said lid body.

* * * * *